United States Patent [19]

Kuo et al.

[11] 4,417,996
[45] Nov. 29, 1983

[54] AQUEOUS BASIC POLYALUMINUM-IRON HALIDE SOLUTIONS

[75] Inventors: Vincent H. S. Kuo, Liverpool; Christian A. Wamser, Camillus, both of N.Y.

[73] Assignee: Allied Corporation, Morris Township, Morris County, N.J.

[21] Appl. No.: 418,879

[22] Filed: Sep. 16, 1982

Related U.S. Application Data

[60] Division of Ser. No. 218,984, Dec. 22, 1980, Pat. No. 4,362,643, which is a continuation of Ser. No. 55,416, Jul. 6, 1979, abandoned.

[51] Int. Cl.³ .................. C01F 7/56; C01G 49/10; C02B 1/20
[52] U.S. Cl. .................. 252/175; 423/463
[58] Field of Search .......... 423/463; 210/702, 716, 210/722, 723; 252/60, 175

[56] References Cited

U.S. PATENT DOCUMENTS

| | | |
|---|---|---|
| 1,324,118 | 12/1919 | Hottinger et al. |
| 2,177,857 | 10/1939 | Bevan .................. 210/2 |
| 2,196,016 | 4/1940 | Huehn et al. .......... 23/50 |
| 2,392,153 | 1/1946 | Kasining ............... 23/92 |
| 2,392,531 | 1/1946 | Huehn et al. .......... 204/94 |
| 2,791,486 | 5/1957 | Appell ................... 23/50 |
| 2,858,269 | 10/1958 | Harwood et al. ....... 210/42 |
| 3,173,863 | 3/1965 | Oster et al. ............ 210/52 |
| 3,497,459 | 2/1970 | Nakamura et al. ..... 252/317 |
| 3,544,476 | 12/1970 | Aiba et al. ............. 252/175 |
| 3,929,666 | 12/1975 | Aiba et al. ............. 252/317 |
| 4,005,009 | 1/1977 | Kinoshita et al. ....... 210/44 |
| 4,034,067 | 7/1977 | Seigneurin et al. ..... 423/462 |

OTHER PUBLICATIONS

Process Design Manual for Sludge Treatment and Disposal-US EDA Report-625/1-74-006, Chapter 6, p. 13, (Oct. 1974).

*Primary Examiner*—Dennis L. Albrecht
*Attorney, Agent, or Firm*—Thomas D. Hoffman

[57] ABSTRACT

Aqueous basic polyaluminum-iron halide solutions, useful as coagulants in waste water treatment are disclosed. The polyaluminum-iron halide solution is prepared by reacting an aqueous polyaluminum halide solution with one or more members of the group consisting of ferrous halide and ferric halide resulting in a solution containing a concentration of metal ions ranging from about 1.35 to 4.5 mol/liter as a dissolved salt of the formula $$Al_{1-x}Fe_x^{III}Fe_y^{II}(OH)_{3+2y-z}Hal_z$$

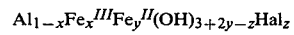

wherein Hal is chlorine, bromine, iodine or mixtures thereof; $(x+y)/(1-x)$ is about 0.2 to 1.5; $(3+2y-z)/(3+2y)$ is about 0.24 to 0.67; and z is less than $3+2y$ wherein x/y is about 0 to 1. Alternatively, the coagulant solution is prepared by reacting an aqueous aluminum halide solution or low basic polyaluminum halide solution with iron. Preferably the halide employed is chloride.

4 Claims, No Drawings

AQUEOUS BASIC POLYALUMINUM-IRON HALIDE SOLUTIONS

This application is a division, of application Ser. No. 218,984, filed Dec. 22, 1980, now U.S. Pat. No. 4,362,643, which is a continuation of application Ser. No. 055,416, filed July 6, 1979, now abandoned.

DESCRIPTION

Field of the Invention

The present invention relates to aqueous basic polyaluminum-iron halide solutions useful as coagulants in waste water treatment.

BACKGROUND OF THE INVENTION

Wastewaters frequently require treatment in order to remove carried materials which could damage the environment. Alum and ferric salts such as ferric sulfate and ferric chloride, and chlorinated copperas, are well-known coagulants, particularly in waters having a pH in the acid range between 4.5 and 6.5. Ferrous salts likewise are effective coagulants in this alkaline pH range. Other known coagulants include basic halide salts of either iron or aluminum.

SUMMARY OF THE INVENTION

An aqueous basic polyaluminum-iron halide solution and methods for preparing same are disclosed. The solution contains a polyaluminum-iron halide of the formula $$Al_{1-x}Fe_x^{III}Fe_y^{II}(OH)_{3+2y-z}Hal_z$$

wherein $(x+y)/(1-x)$ is from about 0.2 to about 1.5; $(3+2y-z)/(3+2y)$ is from about 0.24 to about 0.67; and z is less than $3+2y$. Hal is chlorine, bromine or iodine or mixtures thereof. In a preferred aspect of the invention the solution contains a polyaluminum iron chloride of the formula $$Al_{1-x}Fe_x^{III}Fe_y^{II}(OH)_{3+2y-z}Cl_z$$

wherein $x+y/1-x$ is from about 0.2 to about 1.5; $(3+2y-z)/(3+2y)$ is from about 0.24 to about 0.67; and z is less than $3+2y$.

Solutions having concentrations of metal ions ranging from about 1.35 to 4.5 mole/liter are preferred. The solutions are useful as coagulants in waste water treatment, especially at alkaline pH values.

DETAILED DESCRIPTION OF THE INVENTION

According to the present invention aqueous polyaluminum-iron halide solutions of the formula $$Al_{1-x}Fe_x^{III}Fe_y^{II}(OH)_{3+2y-z}Hal_z$$

wherein Hal is chlorine, bromine, iodine or mixtures thereof with chlorine preferred; $(x+y)/(1-x)$ is about 0.2 to 1.5; the molar ratio of iron (II) and iron (III) to aluminum is in the range of about 0.2 to 1.5. $(3+2y-z)/(3+2y)$ is about 0.24 to 0.67; the mole percent of hydroxide (OH) to the sum of hydroxide and halogen (Hal) is in the range of 24% to 67%. and z is less than $3+2y$ are coagulants for water treatment. The ratio of x/y can be any value and is preferably from about 0 to 1. Thus, the molar ratio of ferric to ferrous is in the range from about 0 to 1, i.e., the mole percent of ferrous is preferably from 50% to 100% and the mole percent ferric is preferably from 0 to 50%. Preferably $(x+v)/(1-x)$ is about 0.4 to 0.6. Also preferred are solutions wherein $(3+2y-z)/(3+2y)$ is from about 0.5 to about 0.67. Thus, the mole percent of hydroxide to the sum of hydroxide and halogen in the solution is in the range of about 50% to 67%. The ratio of ferrous ions to total iron is preferably from about 0.5 to 1.0 and z represents the relative amount of halide present. The basicity is defined as the ratio $(3+2y-z)/(3+2y)$. The preferred concentration of the solutions is from about 1.35 to 4.5 mole/liter of metal ions. Thus, the sum of $1-x$ (aluminum) and x (ferric) and y (ferrous), i.e., the sum of the preferred concentration of metal ions equal to $1+y$ is in the range of about 1.35 to 4.5 moles/liter, i.e., the preferred concentration of ferrous (y) is in the range of 0.35 to 3.5 moles/liter. A complete solution of the salts in the water is preferred.

The aqueous basic polyaluminum iron halide solutions of this invention may be prepared by one of the following methods although chloride solutions are specifically described, other halides (bromide, iodide and mixed) solutions can be similarly prepared.

An aqueous polyaluminum chloride solution is mixed with one or more members of the group consisting of ferrous chloride and ferric chloride. The materials are mixed at ambient condition.

Polyaluminum chloride solutions are available commercially, at concentrations ranging from 13 to 24% $Al_2O_3$ and basicities of from about 40 to 83%. The polyaluminum chloride solutions may be prepared by a variety of processes such as those disclosed in U.S. Pat. No. 2,196,016, 2,392,153, 2,392,531 and 2,791,486, which are herein incorporated by reference. Aqueous solutions of polyaluminum chloride useful as starting solutions for mixing have molar concentrations from about 3 to 6 and a basicity from about 40 to 85 percent. The ferric chloride and ferrous chloride materials can be employed in solid form but are preferably employed as aqueous solutions.

Aqueous ferrous chloride solution is available commercially in technical form as spent pickle liquor, or may be readily prepared by dissolving commercial $FeCl_2.4H_2O$ in the appropriate quantity of water. Concentrations of up to 40 weight percent ferrous chloride in water may be obtained.

Aqueous ferric chloride solution is available commercially in technical form as a by-product from ore-processing operations containing typically about 45 weight percent ferric chloride or may be readily prepared by dissolving commercially available $FeCl_3.6H_2O$ in the appropriate amount of water.

Alternatively the aqueous halide solution of this invention may be prepared by reacting an aqueous aluminum halide solution or aqueous low basic polyaluminum halide solution i.e. having a basicity of about 0 to 30 percent with metallic iron. When the halide is chloride, the concentration of the aluminum chloride solution is from about 1 to 3 mole/liter. The molar concentration of the basic aluminum chloride solution is from about 1 to 3 mole/liter and the basicity of the basic aluminum chloride solution is from about 0 to 30%. The iron can be scrap metal, filings, chips, etc. and has a content of iron over about, 92 percent. The reaction temperature of the solution with the iron is preferably near the boiling point from about 100° to 110° C. The reaction time for dissolving the iron in the solution is dependent on temperature and the particle size of the iron and may require several days. After reacting with the iron the solution is preferably filtered to remove suspended solid materials. In such a solution the iron is present largely as divalent iron. In the presence of air and/or oxygen the ferrous iron in the solution would oxidize to ferric iron.

Alternatively, the aqueous halide solutions of this invention are prepared by reacting high iron content aluminous ores with hydrohalic acid. When the hydrohalic acid is hydrochloric acid, then the amount of hydrochloric acid is deficient relative to formation of stoichiometric salts from the ore. The amount of hydrochloric acid employed corresponds to a halide salt formation of the ore metals from 40 to 80 percent. Ores useful in the present invention include Argentine laterite, low grade high iron bauxite, or other ferruginous alumina ores. The hydrochloric acid employed has a concentration of from about 20 to 37 percent. The temperature of the reaction with hydrochloric acid is preferably near the boiling point of the mixture, which can be raised by application of pressure. The reaction time is from about 50 to 150 hours. Preferably the resulting solution is filtered to remove suspended solids.

Preferably, the aforesaid reaction is carried out in a countercurrent fashion, i.e. the flow of the two reactants is in opposite directions and the desired solution is withdrawn from the same side as where the ore is entered. Preferably, hydrochloric acid of a concentration from about 20 to 37 is applied to a leached ore. The resulting solution alone or admixed with water is then applied to a less leached ore. This step may be repeated several times. Finally the fresh ore is contacted with a solution containing the metals dissolved from prior leached ores.

Alternatively, the aqueous halide solutions of this invention are prepared by reacting an aqueous ferric chloride solution with alumina. Alumina suitable for reaction with ferric chloride contains from about 25 to 65 weight percent aluminum oxide. The ferric chloride solution has a concentration of from about 20 to 40 weight percent. The relative weight ratio of ferric chloride to alumina employed in the reaction is from about 1 to 5.

The solutions obtained by the methods set forth above have properties depending substantially on their composition and are substantially equivalent despite the variances in the modes of preparation.

The coagulants of the present invention are equivalent to or better than conventional high performance coagulants such as Taki PACS 250 AD (a polyaluminum chloride sulfate) for water treatment. The coagulants of the present invention are economically attractive in having some aluminum replaced by iron. The coagulants of the present invention can be prepared employing inexpensive starting materials such as metallic iron scrap, by-product ferric chloride or spent pickle liquor. The stability of the solutions obtained decreases with increasing metal concentration, iron to aluminum ratio and basicity. Solutions containing higher proportions of ferrous ions are more stable as long as the ferrous ion is not oxidized to ferric ion.

The coagulation performance is determined on the basis of turbidity reduction by a selected single dose using a standard coagulation "jar" test similar to that described in ASTM D2035-68. Incorporation of excessive amounts of ferric ion into polyaluminum chloride impairs the coagulation performance. Based on coagulation performance a preferred composition has a basicity from about 50 to 67%, from about 50 to 100% of the iron in ferrous form and an iron to aluminum ratio from about 0.4 to 0.6.

EXAMPLES 1-3

These examples illustrate the production of polyaluminum-iron chloride solutions (PAFC) by reacting basic aluminum chloride solutions (PAC) with $FeCl_3$ and/or $FeCl_2$ in appropriate proportions. The proportions of PAC and iron chloride depend on the basicity of the available PAC and the desired product composition with respect to Fe/Al ratio and basicity; if the starting PAC is of very high basicity, a final basicity adjustment may be effected by addition of the required amount of HCl.

EXAMPLE 1

Polyaluminum Ferric Chloride

A 54.6% basic PAFC was prepared by combining a commercially available basic aluminum chloride ("Chlorhydrol", containing 21.66% $Al_2O_3$, 8.20% Cl, corresponding to 81.8% basic PAC) with an aqueous $FeCl_3$ solution (containing 26.20% $FeCl_3$):

$Al_2(OH)_{4.91}Cl_{1.09} + FeCl_3 = Al_2Fe(OH)_{4.91}Cl_{4.09}$ 131.9 grams of the $FeCl_3$ solution was added to 100.0 grams of "Chlorhydrol" and 93.0 grams of water with continual stirring, producing 324.9 grams of a clear red solution of density 1.193 with the following composition:
$Al_2O_3 + Fe_2O_3 = 10\%$ $Al_2O_3$ equivalent
Fe/Al molar ratio = 0.50
Basicity = 54.6%

EXAMPLE 2

Polyaluminum Ferrous Chloride

This example resembles in its composition the type of PAFC produced by reacting metallic iron with normal aluminum chloride (see examples 4 and 5).

The preparation from PAC is similar to that described in Example 1 except that ferrous chloride ($FeCl_2$) is used in place of ferric chloride ($FeCl_3$). In addition, basicity is calculated differently since ferrous is divalent while ferric is trivalent. Thus, on the Schorlemmer basicity scale, an OH/Fe molar ratio of 1 is designated 50% for a ferrous system and 33.3% for a ferric system.

A 33% basic PAFC was prepared by combining "Chlorhydrol" of the composition described above with an aqueous ferrous chloride solution containing 24.70% $FeCl_2$ and the required amount of HCl:

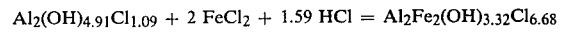

$Al_2(OH)_{4.91}Cl_{1.09} + 2 FeCl_2 + 1.59 HCl = Al_2Fe_2(OH)_{3.32}Cl_{6.68}$ 100.0 grams of "Chlorhydrol" of the same composition as in Example 1, were treated with 53.8 grams of water. The continually stirred mixture was treated with 56.0 ml. of 6.02 N HCl followed by 217.9 grams of the $FeCl_2$ solution producing 433.2 grams of a clear light green solution of density 1.204 with the following composition:
$Al_2O_3 + FeO = 10\%$ $Al_2O_3$ equivalent
Fe/Al molar ratio = 1.0
Basicity = 33%

EXAMPLE 3

Polyaluminum Ferric/Ferrous Chloride

Compositions of this type were prepared in the same manner as in Examples 1 and 2 except that appropriate quantities of both $FeCl_3$ and $FeCl_2$ were added to the PAC.

Thus, to a mixture of 87.6 grams of "Chlorhydrol" (containing 23.58% $Al_2O_3$ and 8.27% Cl) and 58.1 grams of water, the following were added in the sequence shown, with continual stirring:

64.6 grams 37.2% HCl
100.0 grams 12.85% $FeCl_2$
55.5 grams 29.60% $FeCl_3$ producing 365.8 grams of clear orange-colored solution of the following composition:

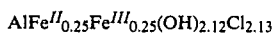

$AlFe^{II}_{0.25}Fe^{III}_{0.25}(OH)_{2.12}Cl_{2.13}$ $Fe^{II}+Fe^{III}/Al=0.50$ molar ratio
$Al+Fe^{II}+Fe^{III}=8.0\%$ $Al_2O_3$ equivalent
Basicity = 50%

A series of $PAF^{III}C$, $PAF^{II}C$, and $PAF^{II}F^{III}C$ solutions were prepared as described above covering concentrations from 7 to 12% (Fe+Al as equivalent $Al_2O_3$), Fe/Al mole ratios from 0 to 1.5, and basicities 24 to 67%. Coagulation performance was evaluated on the basis of turbidity removal by a selected single equivalent metal dose (6.5 ppm equivalent alum) using a standard coagulation test. Standard reference coagulants (aluminum sulfate, Taki "polyaluminum chloride/sulfate") were run at the same time for performance comparison purposes. The results are shown in Table I.

The coagulation performance of polyaluminum-iron chlorides is considerably superior to that of alum and approaches (and even exceeds) the performance of Taki PACS at the higher basicities.

TABLE 1

Coagulation Performance* of Polyaluminum Ferrous and/or Ferric Chloride Solutions

| Coagulant | Total Fe/Al Mole Ratio $\frac{x+y}{1-x}$ | % Basicity $\frac{3+2y-z}{3+2y}$ | Residual Turbidity F.T.U. |
|---|---|---|---|
| Alum | about 0 | 2 | 17 |
| Taki PACS | about 0 | 45 | 5 |
| $FeCl_2$ | about infinite | about 0 | 20 |
| $FeCl_3$ | about infinite | about 0 | 7.2 |
| $PAF^{II}C$ | about 0 | 33 | 6.4 |
| " | 0.5 | 33 | 6.6 |
| " | 1.0 | 33 | 7.3 |
| " | 1.5 | 33 | 9.0 |
| " | 0 | 50 | 4.0 |
| " | 0.25 | 50 | 4.4 |
| " | 0.50 | 50 | 4.5 |
| " | 1.0 | 50 | 6.0 |
| " | 0 | 67 | 3.5 |
| " | 0.25 | 67 | 4.5 |
| $PAF^{III}C$ | 0 | 33 | 6.4 |
| " | 0.25 | 33 | 7.8 |
| " | 0.50 | 33 | 17.0 |
| " | 0 | 54 | 6.4 |
| " | 0.25 | 54 | 7.4 |
| " | 0.50 | 54 | 13.0 |
| " | 0 | 67 | 3.5 |
| " | 0.25 | 67 | 3.8 |
| $PAF^{II}F^{III}C$ | 0 | 33 | 6.4 |
| " | 0.5 | 33 | 7.9 |
| " | 1.0 | 33 | 8.8 |
| " | 0 | 54 | 6.4 |
| " | 0.5 | 54 | 7.3 |
| " | 1.0 | 54 | 8.0 |

*Synthetic turbid water of an initial turbidity of 21 F.T.U., an initial pH of 8.0 and of an alkalinity of 100 ppm as calcium carbonate was employed as test water. The coagulant dose was 6.5 ppm alum equivalent in all cases.

The data shows that the performance is lower than that of the equivalent all-aluminum systems, particularly in the case of the systems in which all the iron is in the ferric form, but much less so for the systems containing ferrous, or ferrous plus ferric. Ferrous iron can replace aluminum in PAC with relatively little impairment of coagulation effectiveness while ferric iron tends to impair performance except at high basicity (in which case the Fe/Al ratio is limited due to physical instability). Combinations of ferrous and ferric iron appear to be intermediate in their effect but closer to the ferrous than the ferric systems.

EXAMPLE 4

Dissolution of iron in the aluminum chloride solution was performed. The $AlCl_3$ solution was prepared by reacting bauxite with hydrochloric acid (36.7% HCl). 46 g. iron fillings (40 mesh, degreased) were gradually added to 1000 ml $AlCl_3$ solution (31.4% $AlCl_3$) in a 2-liter three necked reflux flask with agitation. To avoid foaming and vigorous reactions, the temperature was very slowly raised to reflux (109.6° C.) in a period of 87 hours including overnight reactions. After refluxing for ½ hour, sample A was taken and filtered.

To dissolve more iron in the above solution, additional iron (26 g.) was added. Again the temperature was slowly raised to reflux in 50 hours and held at refluxing for 5 hours. A sample B was taken and filtered.

A third batch of iron (25 g.) was added to the above mixture for further increasing iron content. About 50 hours were used to raise the temperature to 70° C. A third sample C was taken and filtered.

As shown in Table 2, the iron content ($Fe_2O_3$) in the above three samples was increased from 3.3 to 13% while the alumina content was slightly decreased from 9.3% to 8.4%. By assuming all iron was presented as ferric ion, the solution basicity was calculated and increased from 17 to 48%. The standard coagulation tests show that the PAFC solutions with the basicity greater than about 20% (Samples B and C) were superior or equivalent to the Taki 250 AD product, even after 5 months storage.

The coagulation tests for the dependence of water pH on coagulation power for the PAFC solutions after more than 7 months storage were made and the results were compared with the data of liquid alum and Taki product (Table 3). The test water was synthetic turbid water with an initial turbidity of 56 F.T.U. and an alkalinity of 100 ppm as calcium carbonate. The pH was adjusted by addition or removal of carbon dioxide or by treatment with sodium carbonate as required. The coagulant dose was 6.5 ppm alum equivalent in all cases. The data indicate that the coagulant of the present invention after prolonged aging was less pH-dependent and was still better than the Taki product when the final water pH was greater than 8. At about pH 9 the Taki solution showed a residual turbidity of 18 whereas sample C had a residual turbidity of about 15 and sample B had a residual turbidity of 14. For the data in Table 3 synthetic turbid water was employed having an initial turbidity of 56. The dose employed was 6.5 ppm alum equivalent and the alkalinity of the treated water was 100 ppm (as $CaCO_3$).

The iron existed as ferrous ion in the above solutions at the beginning. Some of the ferrous ion was slowly oxidized to ferric ion. After almost one year storage, about 38% of the iron was present as ferric ion and 62% as ferrous ion.

EXAMPLE 5

Example 4 was conducted at high concentration of $Al_2O_3$ or Cl conditions. The solubility of $Al_2O_3$ in polyaluminum chloride solutions depends on the basicity. The solution tends to gel or solidify if the total $Al_2O_3$ is higher than its solubility. The present example was similar to Example 4 except that the total equivalent concentration of $Al_2O_3$ and $Fe_2O_3$ was controlled at 16% with addition of water at the beginning.

A mixture of 500 ml $AlCl_3$ solution (25% $AlCl_3$, prepared from bauxite), 52 g. iron and 217 ml water were added to a one-liter three-necked reflux flask. The mixture was heated gradually from room temperature to 90° C. and maintained at 90°–100° C. for 38 hours. A sample D was taken and filtered. The mixture was further reacted for an additional 20 hours. Another sample E was taken.

To increase the basicity further, 311 g. of above mixture was added with 21 g. iron and 62 ml water for continued reaction with total equivalent $Al_2O_3$ concentration controlled at 21%. The mixture was reacted at 95° C. for 20 hours and a sample was taken (Sample F). The remaining mixture was reacted at the refluxing temperature (103° C.) for 22 hrs. The mixture became thicker during this operation.

The chemical compositions and coagulation data of samples D and F are given in Table 2.

TABLE 2

CHEMICAL COMPOSITIONS AND COAGULATION DATA* (20° C.)

| Compositions, % wt. | | | % Basicity** | pH Initial/Final | Residual Turbidity, FTU |
|---|---|---|---|---|---|
| $Al_2O_3$ | $Fe_2O_3$ | Cl | | | |
| Example 4 | | | | | |
| Sample A | 9.3 | 3.3 | 19.7 | 17 | 8.2/7.9 | 16 |
| Sample B | 8.9 | 5.5 | 19.7 | 24 | 8.0/7.75 | 6 |
| 2 mos later | | | | | 8.2/8.0 | 10 |
| 2 mos later | | | | | 8.2/7.9 | 7*** |
| 4 mos later | | | | | 8.5/8.05 | 13 |
| Sample C | 8.4 | 13.0 | 18.0 | 48 | 8.2/8.0 | 10 |
| 5 mos later | | | | | 8.5/8.2 | 13 |
| Example 5 | | | | | |
| Sample D | 7.1 | 8.7 | 12.8 | 52 | 8.5/8.2 | 19 |
| | | | | | 8.2/8.0 | 9*** |
| Sample F | 4.4 | 8.7 | 9.7 | 53 | 8.5/8.2 | 24 |
| Taki | 9.4 | | | 51 | 8.0/7.9 | 8 |
| 250AD | | | | | 8.0/7.95 | 13 |
| | | | | | 8.2/8.0 | 10 |
| Liquid Alum | 8.3 | | | 3.1 | 8.0/7.7 | 16 |
| | | | | | 8.0/7.75 | 18 |
| | | | | | 8.2/7.85 | 20 |

*54 FTU initial turbidity in water with 8.0–8.5 pH and 90–98 ppm alkalinity as $CaCO_3$. 6.5 ppm dose as alum.
**Assuming all iron as ferric ion.
***Skaneateles Lake water used to make 56 F.T.U. initial turbidity as above (*).

TABLE 3 pH - Dependence of Coagulation Data

| Coagulant | Final pH | Residual Turbidity, F.T.U. |
|---|---|---|
| Alum | 6.50 | 40 |
| " | 6.56 | 25 |
| " | 7.18 | 17 |
| " | 7.68 | 18 |
| " | 8.27 | 30 |
| PAFC, Sample B | 5.30 | 38 |
| " | 6.30 | 18 |
| " | 7.17 | 14 |
| " | 7.76 | 14 |
| " | 8.03 | 13 |
| " | 8.68 | 13 |
| " | 9.37 | 16 |
| PAFC, Sample C | 5.37 | 23 |
| " | 6.32 | 17 |
| " | 7.25 | 14 |
| " | 7.90 | 15 |
| " | 8.20 | 13 |
| " | 8.82 | 15 |
| " | 9.37 | 18 |
| Taki PACS | 6.00 | 7.8 |
| " | 6.50 | 7.6 |
| " | 7.00 | 8.0 |
| " | 7.50 | 9.0 |
| " | 8.18 | 12 |
| " | 9.00 | 18 |

We claim:

1. A method of preparing an aqueous basic polyaluminum-iron halide solution containing a concentration of metal ions ranging form about 1.35 to 4.5 mol/liter as a dissolved salt of the formula $$Al_{1-x}Fe_x^{III}Fe_y^{II}(OH)_{3+2y-z}Hal_z$$

wherein Hal is chlorine, bromine, iodine or mixtures thereof; $(x+y)/1-x)$ is 0.2 to 1.5 $(3+2y-z)/(3+2y)$ is 0.24 to 0.67; z is less than $3+2y$; and wherein x/y is about 0 to 1 by mixing a polyaluminum halide solution with one or more members of the group consisting of ferrous halide and ferric halide.

2. The method as set forth in claim 1 wherein the halide is chloride.

3. A method of preparing an aqueous basic polyaluminum-iron halide solution containing a concentration of metal ions ranging from about 1.35 to 4.5 mol/liter as a dissolved salt of the formula $$Al_{1-x}Fe_x^{III}Fe_y^{II}(OH)_{3+2y-z}Hal_z$$

wherein Hal is chlorine, bromine, iodine or mixtures thereof; $(x+y)/(1-x)$ is 0.2 to 1.5; $(3+2y-z)/(3+2y)$ is 0.24 to 0.67; z is less than $3+2y$; and wherein x/y is about 0 to 1 which comprises reacting an aqueous aluminum halide solution or aqueous low basic polyaluminum halide solution with metallic iron.

4. The method as set forth in claim 3 wherein the halide is chloride.

* * * * *